United States Patent [19]
Langer et al.

[11] 4,321,313
[45] Mar. 23, 1982

[54] ELECTROGENERATIVE REDUCTION OF NITROGEN OXIDES

[75] Inventors: Stanley H. Langer, Madison, Wis.; Kevin T. Pate, Clifton Park, N.Y.

[73] Assignee: Wisconsin Alumni Research Foundation, Madison, Wis.

[21] Appl. No.: 152,728

[22] Filed: May 23, 1980

[51] Int. Cl.³ .............................................. H01M 8/00
[52] U.S. Cl. ....................................... 429/13; 429/14; 429/50
[58] Field of Search ................. 429/13, 14, 15, 16, 429/17, 42, 50, 51

[56] References Cited

U.S. PATENT DOCUMENTS

| | | | |
|---|---|---|---|
| 3,252,837 | 5/1966 | Satterfield et al. | 429/13 |
| 3,294,586 | 12/1966 | Le Duc | 429/13 |
| 3,480,479 | 11/1969 | Nestor | 429/13 |
| 3,505,118 | 4/1970 | Mehra et al. | 429/13 |
| 3,632,449 | 1/1972 | Yardney | 429/13 |
| 3,979,225 | 9/1976 | Smith et al. | 429/17 |
| 4,204,032 | 5/1980 | McKellen | 429/13 |

*Primary Examiner*—Charles F. Lefevour
*Attorney, Agent, or Firm*—McDougall, Hersh & Scott

[57] ABSTRACT

Nitrogen oxides, such as nitric oxide with hydrogen separated by acid electrolytes, are reacted at porous catalytic electrodes in a configuration to generate electrical energy and selectively reduce the nitric oxide to ammonia, hydroxylamine and other products. Product distribution and reaction rate can be controlled with electrocatalyst, external load and other parameters. The electrogenerative process is applied to the reduction of other gases.

12 Claims, 3 Drawing Figures

ELECTROGENERATIVE REDUCTION OF NITROGEN OXIDES

The Government has rights in this invention pursuant to Grant No. ENG72-04229 and IPA No. 0001 awarded by the National Science Foundation.

This invention relates to the electrogenerative reduction of nitrogen oxides and it relates more particularly to electrochemical energy generation derived from the reduction of nitric oxide alone or admixed with other gases while producing desirable reduction products therefrom.

The electrogenerative process involves coupling electrochemical reactions at opposing electrodes, separated by an electrolyte barrier, to yield a desired chemical reaction with the generation of low voltage electrical energy as a bonus. An electrogenerative process is defined as one in which a thermodynamically favorable reaction (i.e., one with a negative Gibb's free energy change) is carried out in an electrochemical cell to give a desired product and useful byproduct electrical energy. Thus, while the electrogenerative cell operates galvanically (as an energy producer) and shares many features with fuel cells, its primary function is as an electrochemical reactor. Electrogenerative cells are often distinguished by a working electrode (electrode at which the main synthetic reaction takes place) which operates in potential regions different from those found in corresponding conventional electrochemical routes. Also, one or both electrodes are often dependent on electrocatalysis to achieve appreciable current densities at polarizations low enough to permit galvanic operation. An advantage of the electrogenerative system in contrast to heterogeneous catalytic systems is that reactant competition for adsorptive sites is minimized, allowing thermodynamic factors to operate across the interface to favor reaction. In the electrogenerative mode, the free energy of reaction is partially converted into potentially useful electrical energy while a desirable chemical reaction is carried out.

The invention will be described with reference to the electrogenerative reduction of nitric oxide but as will subsequently be described, the invention also includes the application of the electrogenerative process to nitric oxide and other nitrogen oxides alone or in the presence of sulphur dioxide, and other reducible gases such as chlorine, fluorine, and the like.

The electrogenerative reduction of nitric oxide here involves the reaction of hydrogen and nitric oxide in the presence of electrocatalytic electrodes and electrolyte. The free electrolyte phase is confined between the electrodes which in turn are connected by an external resistive circuit through an ammeter. Hydrogen reacts at the anode to release hydrogen ions and electrons while the nitric oxide is reacted at the cathode with electrons from the external circuit to generate current at potentials determined by the reactions at each electrode which can be represented as follows:

At the anode—

$$H_2 \rightarrow 2H^+ + 2e$$

At the cathode—

$$2NO + 2H^+ + 2e \rightarrow N_2O + H_2O$$

$$2NO + 4H^+ + 4e \rightarrow N_2 + 2H_2O$$

$$2NO + 6H^+ + 6e \rightarrow 2NH_2OH$$

$$2NO + 10H^+ + 10e \rightarrow 2NH_3 + 2H_2O$$

Figure 1:
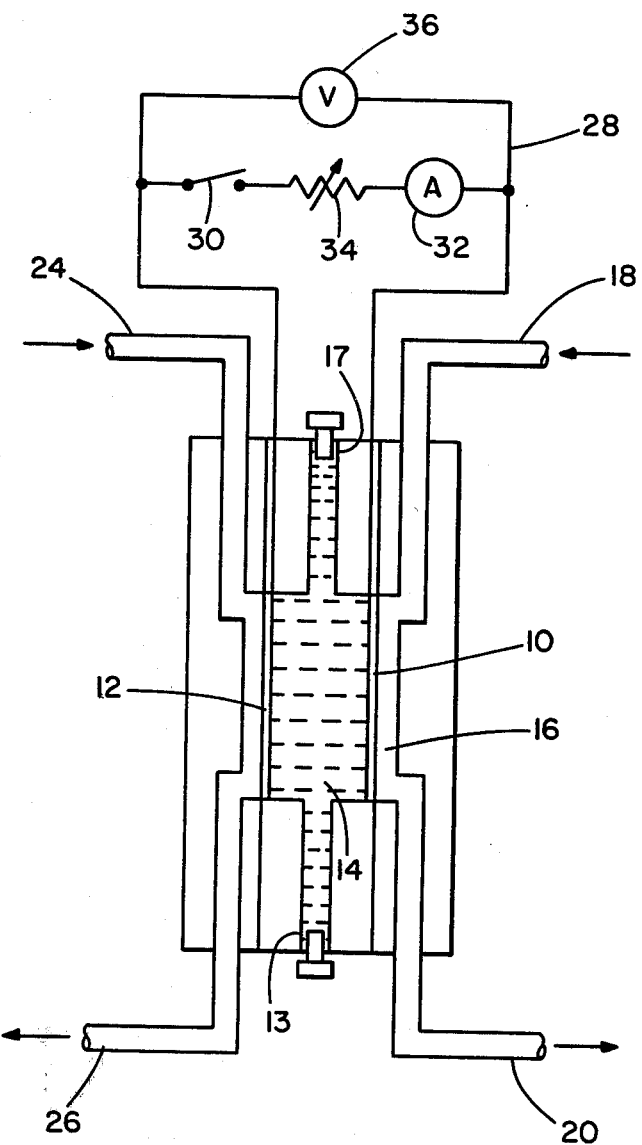
FIG. 1 is a diagrammatic view, partially in section of a electrogenerative cell employed in the practice of the invention.

A diagrammatic sketch of the circuit diagram and apparatus for carrying out the electrogenerative reduction of this invention is shown in the accompanying figure in which the anode 10 and cathode 12 are separated by a chamber 14 containing electrolyte 15. Hydrogen, a hydrogen containing gas or a gas from which hydrogen can be derived by reaction is circulated through passage 16 from an inlet 18 to an outlet 20 for contact with the exterior surface of the anode 10. Nitric oxide or a nitric oxide containing gas is circulated through passage 22 from an inlet 24 to an outlet 26 for contact with the exterior surface of the cathode 12 for reaction as heretofore described. Hydrogen ions generated at the anode flow toward the cathode through the electrolyte 15 between the electrodes.

The electrodes are connected by an external circuit 28 provided with a circuit breaker 30, an ammeter 32 and a variable resistor 34 in series for controlling the potential. Though not essential, a potentiometer 36 can be provided in a parallel circuit.

The selectivity of the process and the rate of the electrogenerative reaction can be controlled by varying the electrode potential, the reaction temperature as well as by the electrocatalyst.

In order to operate efficiently in the described electrogenerative system, the catalytic electrodes should be permeable to the reactant and product gas but only partially wetted by and impermeable to the acidic aqueous electrolyte. Most suitable electrodes may be described as a conglomerate film of electrocatalyst particles and water impermeable polymer particles. Electrocatalysts suitable for use in the practice of this invention are represented as such metals as copper, nickel, cobalt and preferably platinum or ruthenium and other Group VIII metals and the oxides thereof or non-metals such as graphite black. These may be used alone in particle form or deposited on suitable carriers such as carbon, silica and alumina. Representative of the water impermeable polymers in which the electrocatalyst is dispersed are polytetrafluoroethylene, polyethylene, polyvinyl chloride, waxes and the like. Suitable polytetrafluoroethylene bonded porous electrodes containing dispersed catalyst and their method of manufacture are described in Landi U.S. Pat. No. 3,407,096 and No. 3,527,616.

In practice, the electrode film is generally molded into a metallic screen such as tantalum for conductivity and structural integrity. A porous polytetrafluoroethylene (Teflon) or other polymer film backing is applied to the electrode for gas permeability and electrolyte impermeability. Alternatively, the electrodes can be porous conducting electrodes through which gas can be bubbled. Actual catalytic surface area for such porous electrodes have been found to be approximately 4,000 times the geometric area.

In the following examples, use was made of platinum and ruthenium catalysts mechanically backed with polytetrafluoroethylene film with catalyst loadings at 9 mg/cm$^2$. Use was also made of graphite electrodes formed of 95% by weight graphite and 5% by weight Teflon. Electrode thickness, not including the polymer backing, was about 0.02 cm for the platinum and ruthenium electrodes and 0.02 inches for the graphite electrodes. The porous Teflon back was 0.02 cm thick.

Efficient high surface area electrodes are desired for effective product and energy output. Porous electrodes with high surface area tend to give high limiting currents. High reactant concentrations will tend to minimize any mass transport limitations at either electrode. Since ohmic losses in the electrolyte result in power loss, an electrolyte characterized by high electrolytic conductivity and close spacing of the electrodes is desirable.

As the electrolyte, it is desirable to make use of an aqueous acidic electrolyte having a ph below 6 and preferably below 4. Suitable electrolytes can be formulated of such inorganic acids as sulphuric acid, hydrochloric acid, perchloric acid and phosphoric acid and related salts. The liquid electrolyte can be circulated through the chamber 14 from an inlet 13 to an outlet 17, as when the electrolyte absorbs or dissolves some of the gaseous reaction products or reactants. Alternately the liquid electrolyte may be provided between the electrodes in an absorbent carrier such as blotting paper or the like. Ion exchange membranes or semi-permeable diaphrams or related materials may be used to separate anode and cathode compartments. In the examples hereinafter described, use has been made of $HClO_4$, $H_2SO_4$, $H_3PO_4$, $HNO_3$ and $HCl$. Reagent grade purity acids were diluted with distilled water to the desired concentration for use as an electrolyte.

In the examples, the direct current generated by the cell was controlled by a variable resistance load in series with the cell, in which the variable resistance was a decade resistance box (General Radio Co., Type 142N) adjustable from 0.1–10$^3$ ohms. The current was measured by a millimeter (Triplett Ammeter Model 420) and the cell voltage was measured by a digital millivoltmeter (Data Precision Multimeter Model 248, 10 Mohm input impedence).

EXAMPLE 1

This example is concerned with the effects of basic parameters on product selectivity with pure NO in the feed stream to the cathode. Electrocatalyst, potential, and gas feed rate effects were evaluated using platinum, ruthenium and graphite black catalytic electrodes at the cathode. A platinum black electrode was used exclusively at the anode. Table 1 shows the results for the cell using concentrated NO and pure $H_2$ with three different catalysts at various NO cathode feed rates and different operating potentials (controlled by different external circuit loads). The electrolyte was perchloric acid.

TABLE 1

NO/$H_2$ Cell Data -- Effect of Catalyst, Cathode Feed Rate, and Potential (Pt Black Anode)

| Expt. | Cathode | Electrolyte | NO Feed Rate, cc/min | Cathode[a] Potential, volts | Current Density, mA/cm$^2$ | NO Reduction Product Selectivity[b] % | | | | Current[c] Efficiency, % | NO[d] Conversion, % |
|---|---|---|---|---|---|---|---|---|---|---|---|
| | | | | | | $N_2O$ | $N_2$ | $H_2OH$ | $NH_3$ | | |
| 1 | Pt | 2N $HClO_4$ | 3.7 | 0.582 | 59 | 100.0 | 0.0 | 0.0 | 0.0 | 96.2 | 92.0 |
| 2 | Pt | 2N $HClO_4$ | 1.7 | 0.539 | 31 | 99.3 | 0.0 | 0.0 | 0.7 | 94.4 | 97.4 |
| 3 | Pt | 2N $HClO_4$ | 3.7 | 0.231 | 110 | 67.5 | 15.1 | 1.4 | 16.0 | 98.4 | 99.0 |
| 4 | Pt | 2N $HClO_4$ | 1.6 | 0.185 | 76 | 29.7 | 35.3 | 1.8 | 33.3 | 95.2 | 99.6 |
| 5 | Ru | 2N $HClO_4$ | 3.7 | 0.410 | 3 | 74.4 | 15.9 | 0.0 | 9.8 | 100.5 | 2.6 |
| 5 | Ru | 2N $HClO_4$ | 4.0 | 0.080 | 15 | 0.0 | 22.7 | 6.0 | 71.3 | 93.5 | 4.3 |
| 7 | Ru | 2N $HClO_4$ | 1.8 | 0.077 | 18 | 0.0 | 9.9 | 4.3 | 85.8 | 102.2 | 12.0 |
| 8 | C[e] | 2N $HClO_4$ | 2.1 | 0.005 | 0.5 | 0.0 | 0.0 | 3.7 | 96.3 | 45.4 | ~0.0 |

[a]Relative to the hydrogen electrode.
[b]Normalized to 100%.
[c]Based on generated current and analysis of cathode gas streams and electrolyte.
[d]Conversion after single pass through cell.
[e]Cathode operated without Pt screen current collector to prevent Pt catalysis.

Analysis of the product selectivities for the various conditions shows that the product distribution is sensitive to flow rate and potential. At high flow rates less reduced species, such as $N_2O$ predominate while at low flow rates $NH_2OH$ and, especially, $NH_3$ become significant. At high potential, the less reduced species are favored while at low potential ammonia formation greatly increases. Platinum was most active in terms of overall NO conversion with nearly total (>99%) conversion occurring in only a single pass at the low flow and low potential conditions (Experiment 4).

Experiment 1 with the platinum electrode, high NO feed rate, and high operating potential was the most selective condition for $N_2O$ formation with approximately 100% of the NO reacted forming $N_2O$. Experiment 7 with the ruthenium electrode, low NO feed rate, and low operating potential was the most selective condition observed for ammonia formation with 86% of the NO reacted forming $NH_3$.

Figure 2:
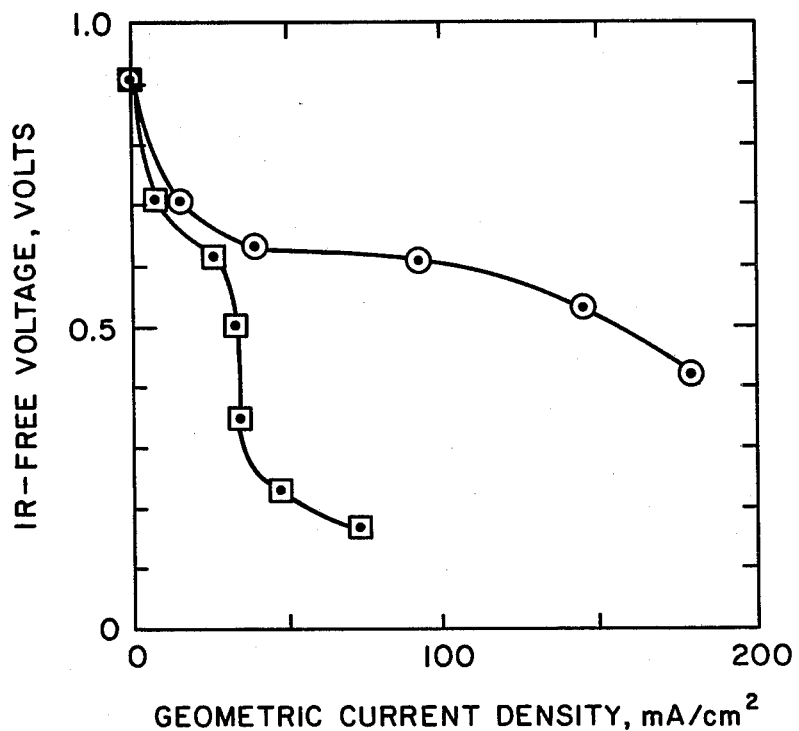
FIG. 2 is a polarization curve obtained with a platinum cathode.
Figure 3:
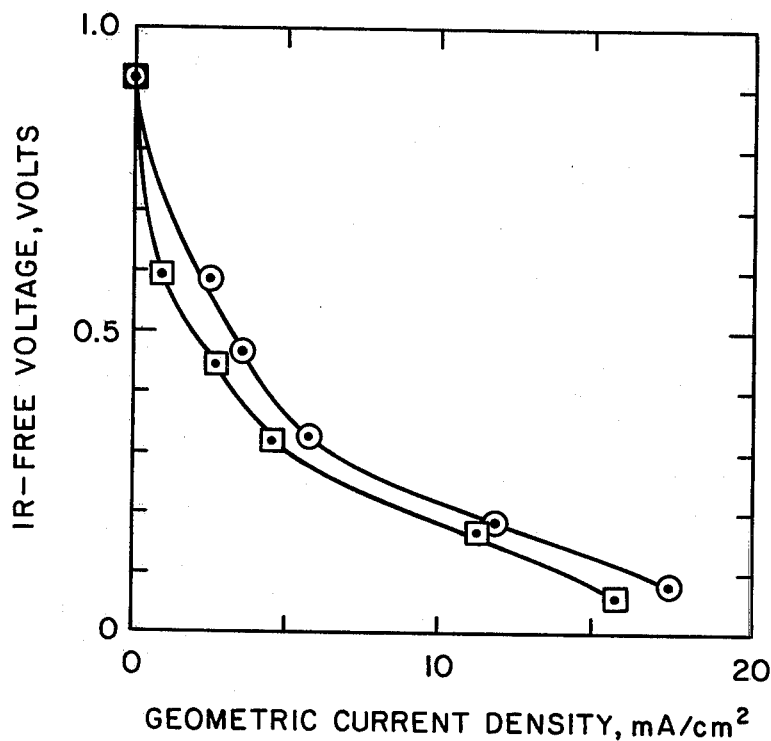
FIG. 3 is a polarization curve obtained with a ruthenium cathode.

By varying the external circuit resistance and monitoring the generated current, polarization curves were obtained for the two catalyst systems as illustrated in FIG. 2 (platinum) and FIG. 3 (ruthenium). The open circuit potential of 0.91 v is reminiscent of that for a hydrogen-oxygen fuel cell and may reflect dissociative adsorption at the cathode to give absorbed N and surface oxygen. The cell polarization with Pt is seen to be strongly dependent on flow rate. This is because concentration polarization effects become very significant when NO conversion is high. This is especially evident in the low flow Pt run where the NO conversion reached 97%. In contrast to Pt, the cell polarization with Ru was nearly independent of flow rate. This was probably due to two factors. First, the cell was operating at low NO conversion (low current density) and, therefore, exhibited little concentration polarization. Second, the stronger adsorption characteristics of Ru with nitrogen compounds may enable it to be less sensitive than Pt to flow rate effects.

Table 2 shows the product selectivity and No conversation as a function of potential for the Pt and Ru catalyst systems at different NO feed rates. On Pt at high flow rate only $N_2O$ is formed although the lowest cell potential achieved was only 0.4 v because of high ohmic losses due to large current draw. At the low flow rate (Experiment 10) where lower potentials were achieved, the $N_2O$ selectivity drops off and $NH_3$ rises significantly at potentials less than 0.4 v. The crossover point (approximately 50% $N_2O$ and 50% $NH_3$) would occur at near 0.15 v. Extrapolating to lower potential (close to 0 v), $NH_3$ will predominate and might attain nearly 100% selectivity. The data for Ru (Experiments 11 and 12) show that the product selectivities are nearly independent of flow rate, but, as with Pt, are a strong function of potential. At potentials below 0.6 v the $N_2O$ selectivity drops off and the $NH_3$ rises. The crossover point on Ru occurs between 0.15 v and 0.2 v with $NH_3$ selectivity predominating at lower potentials. Both Pt and Ru are active for either $N_2O$ or $NH_3$ formation, depending on potential. The stronger nitrogen adsorption characteristics of Ru make it more resistant than Pt to flow rate effects enabling $NH_3$ formation even at high flow rate.

TABLE 2

NO/$H_2$ Cell Data -- Effect of Catalyst, Cathode Feed Rate, and Potential (Pt Black Anode)

| Expt. | Cathode | Electrolyte | NO Feed Rate, cc/min | Cathode Potential, volts | Current Density, mA/cm$^2$ | No Reduction[a] Product Selectivity, % | | | | Current[b] Efficiency, % | NO Conversion, % |
|---|---|---|---|---|---|---|---|---|---|---|---|
| | | | | | | $N_2O$ | $N_2$ | $NH_2OH$ | $NH_3$ | | |
| 9 | Pt | 2N HClO$_4$ | 20 | 0.710 | 15 | 97.4 | 0.0 | 0.2 | 2.4 | 100 | 5.3 |
| | | | | 0.667 | 39 | 95.6 | 0.0 | 0.3 | 4.2 | 100 | 13.5 |
| | | | | 0.611 | 91 | 94.7 | 0.0 | 0.4 | 4.9 | 100 | 26.7 |
| | | | | 0.534 | 146 | 96.1 | 0.0 | 0.3 | 3.6 | 100 | 40.0 |
| | | | | 0.409 | 179 | 97.8 | 0.2 | 0.1 | 1.9 | 100 | 56.4 |
| 10 | Pt | 2N HClO$_4$ | 2.2 | 0.708 | 8 | 98.6 | 0.0 | 0.1 | 1.3 | 100 | 21.2 |
| | | | | 0.619 | 27 | 98.5 | 0.0 | 0.1 | 1.4 | 100 | 78.1 |
| | | | | 0.501 | 32 | 98.5 | 0.0 | 0.1 | 1.4 | 100 | 94.4 |
| | | | | 0.350 | 33 | 98.5 | 0.0 | 0.1 | 1.4 | 100 | 96.3 |
| | | | | 0.233 | 47 | 81.6 | 5.5 | 0.8 | 12.0 | 100 | 96.6 |
| | | | | 0.163 | 73 | 58.1 | 5.4 | 2.4 | 34.1 | 100 | 97.3 |
| 11 | Ru | 2N HClO$_4$ | 9.3 | 0.588 | 2.6 | 100.0 | 0.0 | 0.0 | 0.0 | 100 | 1.3 |
| | | | | 0.462 | 3.6 | 92.5 | 0.0 | 0.5 | 7.0 | 100 | 2.7 |
| | | | | 0.320 | 5.9 | 83.2 | 0.0 | 1.1 | 15.7 | 100 | 4.1 |
| | | | | 0.186 | 11.9 | 53.0 | 0.0 | 3.0 | 44.0 | 100 | 4.1 |
| | | | | 0.078 | 17.3 | 37.8 | 0.0 | 4.1 | 58.1 | 100 | 4.7 |
| 12 | Ru | 2N HClO$_4$ | 1.0 | 0.596 | 1.0 | 100.0 | 0.0 | 0.0 | 0.0 | 100 | 7.4 |
| | | | | 0.449 | 2.8 | 88.4 | 0.0 | 0.8 | 10.8 | 100 | 17.1 |
| | | | | 0.310 | 4.6 | 82.6 | 0.0 | 1.1 | 16.3 | 100 | 22.9 |
| | | | | 0.169 | 11.3 | 44.2 | 0.0 | 3.6 | 52.2 | 100 | 28.5 |
| | | | | 0.052 | 15.7 | 32.1 | 3.4 | 4.2 | 60.3 | 100 | 29.4 |

[a] $N_2O$ and $N_2$ determined by CC analysis of product stream; $NH_3$ and $NH_2OH$ defined from unaccounted balance. Analysis of electrolyte at end of runs showed $NH_3/NH_2OH = 15/1$.
[b] This is based on normalization of assumed current efficiency as indicated.

Table 3 shows the effect of various common acid electrolytes on the product selectivity and NO conversion for the NO/$H_2$ cell with Pt and Ru cathodes. Only minor difference in results between HClO$_4$, $H_2SO_4$, and $H_3PO_4$ is observed. ClO$_4$—, SO$_4$— and $H_2PO_4$— tend to interact little with the catalyst surface. When Cl— is incorporated as the electrolyte, the hydroxylamine product tends to be favored as shown in Examples 17-19.

TABLE 3

NO/$H_2$ Cell Data -- Effect of Electrolyte (Pt Black Anode)

| Expt. | Cathode | Electrolyte | NO Feed Rate, cc/min | Cathode Potential, volts | Current Density, mA/cm$^2$ | NO Reduction Product Selectivity, % | | | | Current Efficiency, % | NO Conversion, % |
|---|---|---|---|---|---|---|---|---|---|---|---|
| | | | | | | $N_2O$ | $N_2$ | $NH_2OH$ | $NH_3$ | | |
| 4 | Pt | 2N HClO$_4$ | 1.6 | 0.185 | 76 | 29.7 | 35.3 | 1.8 | 33.3 | 95.2 | 99.6 |
| 7 | Ru | 2N HClO$_4$ | 1.8 | 0.077 | 18 | 0.0 | 9.9 | 4.3 | 85.8 | 102.2 | 12.0 |
| 13 | Pt | 6N H$_2$SO$_4$ | 1.8 | 0.197 | 106 | 12.7 | 48.0 | 1.8 | 37.5 | 88.0 | 99.2 |
| 14 | Ru | 6N H$_2$SO$_4$ | 1.5 | 0.085 | 15 | 0.0 | 32.6 | 0.0 | 67.4 | 90.8 | 9.3 |
| 15 | Pt | 6N H$_3$PO$_4$ | 1.9 | 0.365 | 35 | 91.9 | 7.3 | 0.0 | 0.8 | 89.8 | 97.8 |
| 16 | Ru | 6N H$_3$PO$_4$ | 2.2 | 0.065 | 7.0 | 17.3 | 31.0 | 1.2 | 49.7 | 90.0 | 1.3 |
| 17 | Pt | 2N HCl | 1.8 | 0.194 | 58 | 65.6 | 0.0 | 12.7 | 21.7 | 100[a] | 92.9 |
| 18 | Ru | 2N HCl | 2.0 | 0.118 | 26 | 28.3 | 2.3 | 56.4 | 13.0 | 100[a] | 27.6 |
| 19 | Ru | 6N HCl | 2.2 | 0.096 | 24 | 24.0 | 1.8 | 61.1 | 13.0 | 100[a] | 23.7 |
| 20 | Ru | 2N HNO$_3$ | HNO$_3$ was reduced by $H_2$ chemically at anode to form $NH_3$ and $NH_2OH$ | | | | | | | | |

[a] $NH_3$ test does not work in the presence of HCl; $NH_3$ was estimated from unaccounted current fraction based on 100% current efficiency.

EXAMPLE 2

Table 4 tabulates the results obtained with platinum and ruthenium cathodes (3.88 cm$^2$ active area) at constant current. The platinum black electrode was the commercial, American Cyanamid, Teflon backed LAA-2 type (9 mgm/cm$^2$). The ruthenium black electrode (9 mgm/cm$^2$) was an AA-2 type mechanically backed with porous Teflon. Possibilities of employing the electrogenerative cell as a chemical reactor are illustrated by Run 1 with platinum where the majority of the feed is converted to nitrous oxide with little ammonia formation. Nitric oxide flow rate effects are indicated at lower potential Runs 3 and 4 on platinum where either ammonia or $N_2O$ can predominate. This can be rationalized by strongly adsorbed nitric oxide displacement of surface intermediates with faster flow rates, to give less reduced species and longer surface contact time at slower flows to produce more reduced species. Further, slow flow of nitric oxide operates to increase the ratio of $H^+$ to NO and enhance formation of $NH_3$. The lower potential further favors ammonia formation. Sulfuric acid electrolyte with platinum (Run 5) did not give results significantly different from perchloric acid. Results for NO reduction on ruthenium illustrate electrocatalytic specificity toward ammonia formation. Its unusual adsorptive properties for nitrogen and reduced intermediate species diminish ammonia formation dependence on flow rate. The ruthenium favored ammonia formation makes electrogenerative reactor use attractive in conjunction with thermal conversion of nitrogen and oxygen to NO to produce ammonia.

advantages of electrogenerative reactor systems compared to conventional chemical reaction systems.

Commercial application of the NO electrochemical system for $N_2O$, $NH_2OH$, and $NH_3$ production would consist of combining of the electrogenerative cell operating under specific conditions to generate the desired product with another system that would provide the NO feed gas. Most efficient operation of the electrogenerative cell might require some concentration and purification of the NO stream prior to flow into the cell. This could be achieved by selective adsorption and subsequent stripping of the NO with silica gel or an alternate specific adsorbent.

While it is desirable to make use of nitric oxide at high concentration for the electrogenerative process, electrogenerative reduction of nitric oxide can be carried out, in accordance with the practice of this invention, when the nitric oxide is present in concentrations ranging from pure NO to a dilute gas, such as a flue gas, in which the NO concentration may be as low as 50 parts per million (50 ppm).

The high nitric oxide conversion, even at low con-

TABLE 4
RESULTS FROM NITRIC OXIDE
HYDROGEN ELECTROGENERATIVE CELL
(Pt Black anode)

| Expt. | Cathode | Electrolyte[a] | NO Feed Rate, cc/min | Cathode[b] Potential, Volts | Current density, mA/cm$^2$ | Fraction of Total Current[c] | | | | NO Conversion, % |
|---|---|---|---|---|---|---|---|---|---|---|
| | | | | | | $N_2O$, % | $N_2$, % | $NH_2OH$, % | $NH_3$, % | |
| 1 | Pt | C | 3.6 | 0.56 | 52 | 98.3 | 0.0 | 0.0 | 1.7 | 83 |
| 2 | Pt | C | 1.6 | 0.50 | 26 | 78.4 | 20.3 | 0.0 | 1.3 | 97 |
| 3 | Pt | C | 3.8 | 0.21 | 84 | 57.8 | 20.3 | 1.1 | 20.4 | 93 |
| 4 | Pt | C | 1.5 | 0.22 | 63 | 18.4 | 24.7 | 1.8 | 55.2 | 99 |
| 5 | Pt | S | 1.8 | 0.27 | 80 | 14.9 | 21.6 | 1.8 | 61.7 | 96 |
| 6 | Ru | C | 3.8 | 0.23 | 12 | 21.1 | 4.8 | 0.0 | 74.1 | 10 |
| 7 | Ru | C | 1.6 | 0.23 | 14 | 21.1 | 0.4 | 3.8 | 74.8 | 23 |
| 8 | Ru | C | 1.6 | 0.10 | 28 | 7.3 | 3.7 | 2.6 | 86.5 | 34 |

[a]$C = 2N/HClO_4$, $S = 6N/H_2SO_4$
[b]Relative to hydrogen electrode
[c]Normalized to 100 percent Electrogenerative reduction of nitric oxide, in accordance with the practice of this invention, with reactants separated in contrast to heterogeneous catalytic reductions, reactant competition for adsorptive sites is minimized, allowing thermodynamic factors to operate across the interface to favor reaction. One consequence is controlled reaction under mild, room temperature conditions. Possibilities for reacting other nitrogen oxides as well.

These results show that the $NO/H_2$ electrogenerative system can be used to selectively produce predominantly either $N_2O$, $NH_2OH$, or $NH_3$, depending on the cell operating conditions. The electrocatalyst, flow rate, operating potential, and the intentional addition of a catalyst inhibiting agent can all be used to vary and control the product selectivity. The flexibility of this system is very unusual and therefore illustrates many centration, with platinum, ruthenium or active cathodes raises the possibility of using electrogenerative reactors as a means for $NO_x$ pollution control at stationary power plants.

For support of the electrogenerative process of this invention for use in the treatment of flue or exhaust gas in which the concentration of NO is low and is present in admixture with other gases such as $N_2$, $O_2$, CO, $CO_2$ and $SO_2$, a series of experiments were conducted with gas streams formulated to resemble the composition of gas streams exhausted from coal burning power plants.

EXAMPLE 3

The composition of the gases treated as well as treatment variables and results are given in the following Table 5.

TABLE 5
$NO,O_2,CO,CO_2,SO_2,N_2/H_2$ Cell Data
(Pt Black Cathode and Anode, 6N $H_2SO_4$ Electrolyte)

| Expt. | Cathode Feed Rate, cc/min | Cathode Potential, volts | Current Density, mA/cm$^2$ | Current Fraction, % | | $NO \rightarrow NO_2$ Conversion Before Cell, % | NO Conversion Through Cell, % | Overall NO[b] Conversion, % | Overall $O_2$ Conversion, % |
|---|---|---|---|---|---|---|---|---|---|
| | | | | $NO_x$ Reduction | $O_2$ reduction | | | | |
| 29 | 4.5 | 0.112 | 24 | 13.5 | 86.5 | 97.2 | >82.1[d] | >99.5 | 83.5 |
| 30 | 4.8 | 0.029 | 7.0 | 33.3 | 66.7 | 93.7 | 46.0 | 96.6 | 14.7 |
| 31 | 4.8 | 0.030 | 4.9 | 28.8 | 71.2 | 93.6 | 3.1 | 93.0 | 21.8 |
| 32 | 4.6 | 0.056 | 19 | 25.3 | 74.7 | 93.5 | >92.3[d] | >99.5 | 73.3 |
| 33 | 4.8 | 0.054 | 19 | 20.7 | 79.3 | 94.0 | >88.3[d] | >99.3 | 69.7 |

TABLE 5-continued

NO,O$_2$,CO,CO$_2$,SO$_2$,N$_2$/H$_2$ Cell Data
(Pt Black Cathode and Anode, 6N H$_2$SO$_4$ Electrolyte)

| 34 | 5.6 | 0.083 | 28$^c$ | 5.8 | 0.8 | 92.5 | 60.0 | 97.0 | 1.3 |

| Expt. | Composition (vol. %) |
|---|---|
| 29 | 1.9% NO, 8.6% O$_2$, Bal. N$_2$ |
| 30 | 1.9% NO, 9.2% O$_2$, 1.4% CO, Bal. N$_2$ |
| 31 | 1.7% NO, 6.3% O$_2$, 3.8% CO, Bal. N$_2$ |
| 32 | 1.9% NO, 6.5% O$_2$, 1.3% CO$_2$, Bal. N$_2$ |
| 33 | 1.5% NO, 6.3% O$_2$, 8.1% CO$_2$, Bal. N$_2$ |
| 34 | 1.6% NO, 5.3% O$_2$, 18.3% SO$_2$, Bal. N$_2$ |

$^a$Cathode Feed Composition
$^b$Overall NO conversion to NO$_2$, HNO$_3$, and electrogenerative cell products (mainly NH$_3$).
$^c$Substantial SO$_c$ reduction at the cathode formed H$_2$S(g) and S(solid).
$^d$Final NO concentration in product gas stream was less than 100 ppm (limit of GO detectability here) after single pass through cell.

These results clearly indicate that very high conversion of NO was maintained under dilute conditions and in the presence of competitive gases such as O$_2$, SO$_2$, CO, and CO$_2$.

Commercial application of this system would be made up of many catalytic electrodes to give large surface area (similar to commercial fuel cells) for reaction of the large volumetric flow rate of flue gas. A slow single pass, several cells in series, or recycle of the flue gas through the electrogenerative cell would achieve sufficient NO$_x$ conversion for final exhaust to the atmosphere. To maximize catalyst life and minimize poisoning effects the other pollution treatments such as dust collection, CO and hydrocarbon conversion, and SO$_2$ removal might be performed before final passage of the flue gas through the NO electrogenerative reactor. It will be seen that aside from H$_2$ and electrolyte, the cell requires no additional energy or chemical input. Rather it would spontaneously generate direct electricity, a valuable byproduct, from the NO$_x$ and O$_2$ conversion. Also, the NO$_x$ would be converted to NH$_3$ and NH$_2$OH, both valuable products.

It will be seen from Example 3, Experiment 34, that the electrogenerative process described can be used for reduction of other pollutant in power plant effluent such as SO$_2$ wherein the same hydrogen reaction is caused to take place at the anode to release hydrogen ions and electrons while the reaction at the cathode reduces SO$_2$ to sulphur with the consumption of electrons, in accordance with the equation $$SO_2 + 4H^+ + 4e \rightarrow S + 2H_2O$$

Thus, the electrogenerative reduction process of this invention can be applied for the conversion of both nitric oxide and sulphur dioxide with the concurrent generation of electrical energy to supplement energy produced by the power plant.

The electrogenerative process of this invention can also be used in the treatment of gases containing other acid gases such as in the removal of chlorine from gases exhausted in various chemical or scrubbing operations, with the reduction of the chlorine gas at the cathode to chloride ions as in the reaction $$Cl_2 + 2e \rightarrow 2cl^-$$

The ions that are formed will be absorbed by the aqueous electrolyte. Under such circumstances, use is made of a cell, as illustrated in FIG. 1, in which the electrolyte is continuously circulated through the chamber from an inlet 13 leading up into chamber 14 to an outlet 17 from chamber 14.

Similarly, fluorine gases can be removed from the gases exhausted from an aluminum pot line, for recovery of the fluorine and for removal of fluorine from the gases exhausted to the atmosphere.

Since chlorine and fluorine tend to poison catalysts formed of platinum or ruthenium, it is preferred to make use of other electrocatalysts such as carbon black.

By way of further modification, in most instances, the reaction efficiency is improved with increase in reaction temperature. It is undesirable to make use of a reaction temperature that exceeds the boiling point of the liquid electrolyte. However, where use is made of an electrolyte having a high boiling point, temperatures in excess of 100° C. can be used such as reaction temperatures of about 180° C. in the presence of an electrolyte formulated of phosphoric acid. Such elevated reaction temperatures are readily maintained when the described electrogenerative process is employed in the treatment of hot effluent from power plants and the like for removal of pollutant gases with the beneficial generation of additional energy.

It will be understood that hydrogen availability at the anode can be derived from sources other than hydrogen gas, such as for example, by supply of carbon monoxide and water to yield carbon dioxide and hydrogen in accordance with the reaction $$CO + H_2O \rightarrow CO_2 + H_2$$

It will be understood that changes may be made in the details of formulation and operation without departing from the spirit of the invention, especially as defined in the following claims.

We claim:

1. The electrogenerative reduction of an acid gas including, coupled with a by-product of electrical energy comprising disposing a pair of gas permeable electrodes closely adjacent one to another, one of which is an anode and the other of which is a catalytic cathode, disposing a hydrogen ion permeable liquid electrolyte in contact with the adjacent surfaces of the electrodes, connecting the electrodes through an external electrical circuit, exposing the anode to hydrogen for reaction to produce electrons and hydrogen ions which pass into the electrolyte, passing a gas containing the acid gas into contact with the cathode while maintaining the potential below 0.4 volts for reaction with hydrogen ions traveling through the electrolyte from the anode to the cathode to produce hydroxylamine (NH$_2$OH) and ammonia (NH$_3$) in accordance with the equations:

$$2NO + 6H^+ + 6e \rightarrow 2NH_2OH$$

$$2NO + 10H^+ + 10e \rightarrow 2NH_3 + 2H_2O$$

removing electrolyte from between the electrodes, and recovering hydroxylamine and ammonia from the displaced electrolyte.

2. The electrogenerative reduction as claimed in claim 1 in which the acid gas is a gas containing nitric oxide.

3. The electrogenerative reduction as claimed in claim 1 in which the acid gas contains nitric oxide in a concentration of at least 50 ppm.

4. The electrogenerative reduction as claimed in claim 1 in which the acid gas is in a flue gas from the combustion of a hydrocarbon in the generation of energy.

5. The electrogenerative reduction process as claimed in claim 4 in which the flue gas contains NO which is converted to $N_2$ in accordance with the equation:

$$2NO + 4H^+ + 4e \rightarrow N_2 + 2H_2O.$$

6. The electrogenerative reduction process as claimed in claim 4 in which the flue gas contains NO which is converted to $N_2O$ in accordance with the equation:

$$2NO + 2H^+ + 2e \rightarrow N_2O + 1H_2O.$$

7. The electrogenerative reduction as claimed in claim 1 in which the electrolyte is an aqueous acidic liquid.

8. The electrogenerative reduction as claimed in claim 1 in which the electrolyte is an aqueous acidic liquid having a pH below 6.

9. The electrogenerative reduction as claimed in claim 1 in which the electrodes are polymer bonded, gas permeable, liquid impermeable porous electrodes.

10. The electrogenerative reduction as claimed in claim 9 in which the electrodes are platinum or ruthenium electrodes or their oxides dispersed in particulate form in the polymer.

11. The electrogenerative reduction as claimed in claim 9 in which the polymer is polytetrafluoroethylene.

12. The electrogenerative process as claimed in claim 1 in which the reduction reaction is carried out at a temperature below the boiling point temperature of the electrolyte.

* * * * *